United States Patent [19]

Gabbard

[11] 4,243,571
[45] Jan. 6, 1981

[54] STAIN-RESISTANT VINYL CHLORIDE POLYMER COMPOSITIONS PLASTICIZED WITH ALKYLBENZYL SUCCINATES, GLUTARATES OR MIXTURES THEREOF

[75] Inventor: James D. Gabbard, Maryland Heights, Mo.

[73] Assignee: Monsanto Company, St. Louis, Mo.

[21] Appl. No.: 972,763

[22] Filed: Dec. 26, 1978

[51] Int. Cl.³ .............................................. C08K 5/09
[52] U.S. Cl. ......................... 260/31.8 H; 260/31.8 W
[58] Field of Search .................... 260/31.8 W, 31.8 H

[56] References Cited

U.S. PATENT DOCUMENTS

| | | | |
|---|---|---|---|
| 1,939,217 | 12/1933 | Kyrides | 260/31.8 W |
| 2,689,865 | 5/1951 | Dazzi | 260/31.8 W |
| 3,042,644 | 7/1962 | Cowell | 260/31.8 H |
| 4,098,748 | 7/1978 | Moore et al. | 260/31.8 H |

Primary Examiner—Joseph L. Schofer
Assistant Examiner—Peter F. Kulkosky
Attorney, Agent, or Firm—George R. Beck

[57] ABSTRACT

In production of solid films (e.g. a floor covering wear layer) by casting, fusing and then cooling a vinyl chloride polymer plastisol, good physical properties of the plastisol and films are provided by use of surprisingly small amounts of plasticizing ester including diester selected from alkyl benzyl succinates, glutarates and mixtures thereof. Using such small amounts of ester, the films have unusually high stain resistance.

14 Claims, No Drawings

STAIN-RESISTANT VINYL CHLORIDE POLYMER COMPOSITIONS PLASTICIZED WITH ALKYLBENZYL SUCCINATES, GLUTARATES OR MIXTURES THEREOF

BACKGROUND OF THE INVENTION

This invention relates to more highly stain-resistant, plasticized vinyl chloride polymer films, and plastisols used in production of such films. Efforts to develop such films are especially important in the vinyl floor covering industry due to the much greater consumer appeal of flooring resistant to common stainants including shoe polish, mustard, road surfacing materials such as asphalt, etc.

In general, it is very desirable to produce plasticized vinyl chloride polymer films without the costs of intensive mixing of polymer and plasticizer, e.g. in a Banbury mixer. Thus for economic reasons, the expedient of plastisol application of vinyl chloride polymer films is employed whenever feasible. In accordance with that technique, now well known in the art, finely divided vinyl chloride polymer (hereinafter "VCP") is essentially uniformly dispersed in an amount of plasticizer sufficient to form a plastisol (normally at ambient temperature) of viscosity low enough for reasonably rapid escape of entrained air and for convenient casting of the plastisol on a solid surface where it will be fused to form an essentially homogeneous, molten film on that surface and then cooled to solidify that film. In addition, the amount of plasticizer employed must be sufficient to provide satisfactory plasticization of the film as shown by its flexibility, percent elongation at break, etc.

Typically, plasticizers used in preparation of such plastisols are carboxylic acid esters such as alkyl benzyl phthalates, dialkyl phthalates, alkyl benzoates, etc. Various diluents, e.g. hydrocarbons which flash off during plastisol processing, may help maintain a desirably low plastisol viscosity but not substantially enhance the plasticizing of the resulting film. In addition, use of such diluents may contribute to other problems such as "blooming" from the film of soaps present in the VCP from its production by emulsion polymerization. Thus a certain amount of "prime" ester (i.e., ester which remains in the VCP film or other composition after fusing and then solidification of the VCP plastisol) is normally considered necessary in plastisol application of VCP, and it is usually expected that the required amount of such prime ester will be from 35 to 70 or more parts per hundred parts by weight of the VCP. See, for example, "Vinyl Dispersion Coatings for Foam Floorings and Fabrics," L. G. Friedman, Soc. of Plastics Engineers, 28th Annual Technical Conference, pp. 226–31 (1971) and Vol. 3, Encyclopedia of PVC, Marcell Dekker, Inc., New York and Basel, p. 1426 (1977).

Unfortunately, the staining tendency of the resulting VCP film is typically more or less proportional to the amount of plasticizing ester present in the film and consequently, it is highly desirable to identify a plasticizing ester which provides an attractively low plastisol viscosity and good plasticization of the resulting film when used in amounts small enough to interfere relatively little with the natural stain resistance of the VCP. Thus it is an object of this invention to provide VCP compositions comprising a more efficient plasticizer such that plastisol-applied films produced therewith are more highly stain-resistant. Another object is VCP compositions containing a relatively small but adequately plasticizing amount of prime ester. Another object is to provide VCP plastisol compositions which can be cast in a film on a solid surface, fused and then cooled to provide a solid, plasticized film (e.g. a floor covering wear layer) having a high degree of stain resistance. Other objects include the resulting stain-resistant floor covering wear layers and other solid films. Another object is the provision of methods for producing such VCP plastisols and the stain-resistant floor covering wear layers and other solid films made from such plastisols. Other objects will be apparent from the following disclosure in which all parts and percentages are by weight except where otherwise noted and "phr" represents parts per hundred parts by weight of VCP in any given composition.

SUMMARY OF THE INVENTION

In accordance with this invention, the aforedescribed objects are achieved by use of a VCP composition comprising a plasticizing amount of prime ester including diester selected from alkyl benzyl succinates, glutarates and mixtures thereof in which said alkyl is from about $C_3$ to about $C_6$. In a preferred embodiment, at least about 40% of the prime ester is such diester and the plasticizing amount of prime ester is less than the 35 phr heretofore generally regarded as the minimum for satisfactory plastisol formation and/or film plasticization. In other embodiments of the invention, a substantial amount of such diester may be included in the VCP composition together with at least one other prime ester to decrease the required amount of plasticizing ester below that which would be normally required using only that other prime ester.

Also provided by the invention are highly stain-resistant floor covering (e.g. vinyl sheet flooring) wear layers and other solid films prepared from such plasticized polymer compositions, and plastisols of such compositions for use in production of such films. Also provided by the invention is a method for producing a VCP composition which can be used to prepare such highly stain-resistant films, which method comprises dispersing finely divided particles of the polymer in a plasticizing amount of prime ester including diester selected from such alkyl benzyl succinates, glutarates and mixtures thereof.

DETAILED DESCRIPTION OF THE INVENTION

As used herein, the term "vinyl chloride polymer" or "VCP" includes vinyl chloride homopolymer (hereinafter polyvinyl chloride or "PVC") and vinyl chloride copolymers in which the structure of polyvinyl chloride is interspersed with residues of other olefinically unsaturated compounds copolymerized therewith. Essential properties of the polymer structure of polyvinyl chloride are normally retained if the monomers are at least about 60% vinyl chloride. Suitable comonomers include, e.g. maleic anhydride, vinyl esters such as vinyl acetate, and many others as suggested in U.S. Pat. No. 2,943,949 issued July 5, 1960 to R. K. Petry, the disclosure of which is incorporated herein by reference.

This invention also relates most advantageously, although not exclusively, to VCP compositions which are essentially unfilled, i.e., not containing a substantial amount of the fillers (generally inorganic, e.g. clay, talc, $CaCO_3$, $TiO_2$, $BaSO_4$, asbestos, etc.) with which such compositions are commonly extended for various uses such as rigid vinyl asbestos floor tile and the like. Thus, the invention has particular applicability to VCP compositions consisting essentially of VCP and a plasticizer therefor, which compositions are especially attractive for use in production of transparent or translucent films and which may also contain, if desired, minor proportions of conventional additives such as colorants, stabilizers, etc., not incompatible with production of plastisol-applied films from such compositions.

This invention is based on the discovery that diester selected from the aforementioned alkyl benzyl succinates and/or glutarates provides or assists in providing good plasticization of VCP plastisols and solid films made therewith at low enough total amounts of prime ester that the resulting films have unusually high stain resistance. In most embodiments of the invention, the amount of prime ester employed is a plasticizing amount, i.e. an amount sufficient to permit convenient plastisol application of the VCP and provide suitably plasticized film produced therewith. In embodiments of the invention using prime ester consisting essentially of such diester, the amount of prime ester which is satisfactory from the standpoint of adequate plasticization is unexpectedly less than 35 phr and in many instances need not be more than about 30 phr. Typically in those embodiments the amount of such diester employed is at least about 20 phr, and best results are normally attained using at least about 25 phr, although there is considerable flexibility in the amount employed depending on the use of diluents, secondary plasticizers, etc., with such diester.

In other embodiments in which such diester is used in combination with other prime ester, such diester plasticizes VCP plastisols and films with such great efficiency that when at least about 40% of the prime ester employed is such diester, the total amount of prime ester required is likewise less than 35 phr and the resulting films are similarly characterized by unusually high stain resistance.

In those embodiments in which such diester is at least about 60% of the prime ester employed, the total amount of required prime ester is generally not more than about 30 phr and the resulting films are typically even more exceptional in stain resistance.

Even in other embodiments in which the amount of prime ester employed is 35 phr or more and such diester makes up less than about 40% but a substantial proportion (e.g. at least about 5%) of the prime ester employed, such diester replaces enough of the other prime ester used therewith that the total amount of prime ester required for adequate plasticization is substantially less than that required without use of such diester. For example, in plastisols and films in which about 50 phr of other prime ester such as texanol benzoates or butyl benzyl phthalate is normally required, the inclusion of about 10 phr of the aforementioned succinates and/or glutarates typically lowers the amount of such other prime ester required for use therewith to about 30 phr and correspondingly lowers the total amount of prime ester required to about 40 phr.

As aforesaid, this invention utilizes alkyl benzyl succinates, glutarates and mixtures thereof, i.e. diesters of succinic and/or glutaric acid in which a benzyl radical is directly attached to one carboxy group of the acid and an alkyl radical is directly attached to the other carboxy group of that acid. The alkyl radical in such diesters may be from about $C_3$ to about $C_6$. In most embodiments it is preferably from $C_3$ to $C_5$, and even more typically it is preferably $C_4$ (butyl). Branching of the alkyl radical is generally advantageous but not necessary. In many embodiments, the descending order of alkyl desirability is isobutyl, n-butyl, sec-butyl, neopentyl, isopropyl and isoamyl. These diesters may be prepared as described in U.S. Pat. No. 3,483,247 issued Dec. 9, 1969 to R. H. Mills. Diesters consisting essentially of either such glutarates or succinates can be satisfactorily employed in this invention as can blends of such succinates and glutarates in virtually any proportions.

The plastisols used in this invention may be compositions consisting essentially of VCP and a plasticizing amount of prime ester. For reasons of economy, however, it is typically preferred to also include in such plastisols a minor proportion of a diluent which further lowers the plastisol viscosity but essentially completely volatilizes during fusing of the plastisol such that little or none remains in solid film produced from such plastisol. Normally such a diluent is composed essentially of hydrocarbon(s) boiling between about 200° and about 325° C. (preferably between about 250° and about 300° C.). Advantageously, such diluent is predominantly composed of monocyclic alkylbenzenes containing from about 14 to about 24 carbon atoms and in which each alkyl substituent on the benzene ring contains from about 6 to about 16 carbon atoms (usually advantageously from about 8 to about 14, and most desirably from about 10 to about 12 carbon atoms). Most conveniently such alkylbenzenes are monoalkylbenzenes. Generally best results are obtained by use of diluent consisting essentially of such alkylbenzenes, but such diluent may also satisfactorily contain a minor proportion of other hydrocarbons, e.g. paraffins and the like, which do not intolerably alter its characteristics of volatility and utility in this invention.

Plastisols of this invention consisting essentially of VCP, prime ester and hydrocarbon diluent, particularly those in which the aforementioned glutarates and/or succinates make up essentially all of the prime ester employed and the proportion of such diluent is not more than about 25% of such prime ester, may be satisfactorily employed in production of solid films which are relatively thin, i.e., up to about 0.3 mm. However, in most embodiments including particularly those used in production of films thicker than about 0.3 mm, it may be desirable to include in the VCP composition an additional component which may serve as a temporary or secondary plasticizer, case-hardening diluent and/or compatibilizer for the prime ester and hydrocarbon diluent. This component is most desirably a nonaromatic ester, typically having a molecular weight from about 230 to about 320. Examples thereof include, e.g. dibutyl succinate and/or glutarate, dimethyl or diethyl adipate or, usually most desirably, a texanol ester of $C_3$–$C_6$ alkyl monocarboxylic acid such as, e.g. one of the butyric acids. As used herein, "texanol" represents the alcohol named 2,6,6,8-tetramethyl-4-oxa-3-oxo-nonan-7-ol under American Chemical Society Chemical Abstract terminology and having the following structural formula

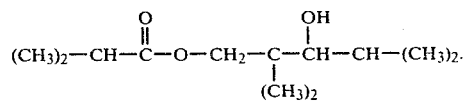

Especially useful in some embodiments of this invention is the diester made by reaction of that alcohol with isobutyric acid, referred to hereinafter as texanol isobutyrate (mW 286). In most embodiments of the invention this non-aromatic diester essentially completely volatilizes during fusing of the VPC plastisol, but there is generally no significant disadvantage if such volatilizing is less than complete inasmuch as such diester can serve as an excellent secondary plasticizer and case-hardening ester and also has good stain-resistance properties.

Most commonly in accordance with this invention, the VCP plastisol is made employing a plasticizer composition containing from about 50% to about 90% prime ester, from about 10% to about 50% of the aforementioned non-aromatic ester and up to about 20% hydrocarbon diluent. In preferred embodiments, those proportions are typically from about 60% to about 80% prime ester, from about 10% to about 30% of the non-aromatic ester and from about 5% to about 15% hydrocarbon diluent. Even more preferred for most uses is a plasticizer composition in which those proportions are from about 65% to about 75% prime ester, from about 15% to about 25% of the non-aromatic ester and from about 5% to about 15% hydrocarbon diluent.

After thorough mixing, the resulting plastisol is cast in a film on a solid surface, fused on that surface and then cooled below its freezing point to provide a solid, essentially homogeneous film which may be later stripped from that surface or permitted to remain thereon for its intended end use, e.g. as a floor covering wear layer. The techniques of producing solid VCP films by casting, fusing and cooling such plastisols are known in the art, and are to be distinguished from production of "solid" vinyl tile made by dryblending and calendaring a mixture of VCP and plasticizer. Most commonly in accordance with this invention, plastisol is applied to the surface on which it will be fused by flow- or dip-molding, rotary screen printing or reverse-roll or knife coating. Normally the resulting film is semi-rigid. Although it is feasible to include a blowing agent in the plastisol, it is more common to omit a blowing agent such that the resulting film is essentially non-cellular.

Presently, an important utility of such plastisol-applied film is as VCP sheet flooring wear layer which can be applied to a plasticized, foamable VCP gel layer which may be situated on any of various suitable solid substrates, for example an asbestos or other paper impregnated with a binder (e.g. acrylic or SBR latex), a suitable release paper, a woven or non-woven (e.g. felted) fabric of organic and/or inorganic fibers or a sheet of thermoplastic material. Normally such a layer is applied in a thickness which, after fusing and cooling, is between about 0.2 and about 0.9 mm. The multi-layered structure thus assembled is then passed through an oven in which it is heated to a temperature sufficient to fuse the two plasticized VCP layers. Techniques for the production of such floor covering are well-known in the art. See U.S. Pat. Nos. 3,293,094 and 3,294,108 issued Dec. 20, 1966 and 2,961,322 issued Nov. 22, 1960 to R. F. Nairn et al. and 3,196,030 issued July 20, 1965 to R. K. Petry, the disclosures of which are incorporated herein by reference.

The following specific examples of this invention are included for illustration only and do not imply any limitations on the scope of the invention.

PREPARATION OF PLASTICIZERS

Plasticizer A is prepared by thoroughly mixing 70 parts isobutyl benzyl succinate, 20 parts texanol isobutyrate and 10 parts hydrocarbon composed of 67.5% linear alkylbenzenes boiling at 274°–295° C. in which the alkyl is from $C_9$ to $C_{14}$ (99% $C_{10}$–$C_{12}$) and 32.5% of a recycle stream (12% of such alkylbenzenes, 3% $C_8$–$C_{16}$ olefins and 85% $C_8$–$C_{16}$ paraffins with the average being $C_{13}$) from production of such alkylbenzenes. Plasticizer B is prepared likewise except there is substituted for the isobutyl benzyl succinate an equal amount of a mixture of two parts isobutyl benzyl glutarate and one part isobutyl benzyl succinate. Plasticizers C, D and E are likewise prepared except that in each, an equal amount of n-butyl benzyl succinate, sec-butyl benzyl succinate or isopropyl benzyl glutarate, respectively, is substituted for the isobutyl benzyl succinate used in preparation of Plasticizer A.

For comparative purposes there are hereinafter used the following commercially available PVC plasticizers:

Plasticizer F—78% texanol benzyl phthalate and 22% dodecylbenzene;

Plasticizer G—60% texanol benzoate, 25% texanol dibenzoate, 14% texanol isobutyrate or benzoate and 1% texanol.

EXAMPLES 1–6

75 parts of a conventional paste-grade low-soap PVC of 1.4 inherent viscosity, 25 parts of a conventional PVC blending resin of 0.9 inherent viscosity and 57 micron mean particle size, 3 parts epoxidized soybean oil and 2 parts Ba/Zn stabilizer are uniformly dispersed with medium-shear, high-torque mixing in plasticizing amounts of Plasticizers A, B, F and G as shown in Table I. The resulting plastisols are identically stirred in such a way as to minimize the entrainment of additional air and then deaerated in a stirred vacuum chamber in which visual observations of air release rates are noted. Initial viscosity of each plastisol is measured by Brookfield Viscometer Model HAT, #5 spindle, in accordance with SPI procedure VD-T1 (1959). Results are in Table I.

TABLE I

| | PLASTISOLS | | | | | | | |
|---|---|---|---|---|---|---|---|---|
| | 1 | 2 | 3 | 4 | 5 | 6 | F | G |
| Plasticizer | A | A | A | B | B | B | F | G |
| phr Plasticizer | 40 | 44 | 48 | 40 | 44 | 48 | 48 | 48 |
| phr Prime Ester | 28 | 30.8 | 33.6 | 28 | 30.8 | 33.6 | 37.4 | 40.8 47.5 |
| Air Release | Fast | Fast | Fast | Fast | Fast | Fast | Med-Fast | Med-Fast |
| Viscosity rpm | Centipoises | | | | | | | |
| 2.5 | 4480 | 3200 | 2240 | 4800 | 3200 | 2240 | 4480 | 5440 |
| 5 | 3200 | 2400 | 1600 | 3360 | 2240 | 1600 | 4000 | 4800 |
| 10 | 2480 | 1760 | 1280 | 2640 | 1840 | 1200 | 3600 | 4560 |
| 20 | 1960 | 1400 | 1000 | 2120 | 1360 | 1000 | 3640 | 4560 |
| 50 | 1600 | 1104 | 800 | 1712 | 1088 | 768 | 4048 | 5216 |
| 100 | 1496 | 1016 | 720 | 1552 | 992 | 696 | 5328 | 6768 |

Samples of plastisols 1–6, F and G are cast on aluminum plates in a uniform 0.64 mm thickness. The cast films are fused by heating on a rotating rack in a forced air oven at 180° C. for 210 seconds, after which they are removed from the oven and allowed to cool. When the films are no longer tacky they are stripped off the plates.

Portions of the films are subjected to measurements of 100% modulus (tensile stress at 100% elongation), % elongation at break and tensile strength, all in accordance with ASTM D412-75. The averages of triplicate measurements are in Table II.

TABLE II

| Plastisol | 100% Modulus (kg/cm²) | % Elongation at Break | Tensile Strength (kg/cm²) |
|---|---|---|---|
| 1 | 115 | 262 | 225 |
| 2 | 102 | 275 | 213 |
| 3 | 86 | 290 | 196 |
| 4 | 110 | 272 | 226 |
| 5 | 95 | 291 | 212 |
| 6 | 82 | 299 | 198 |
| F | 167 | 240 | 244 |
| G | 137 | 260 | 236 |

Additional samples of plastisols 1–6, F and G are cast on a conventional foamable PVC flooring gel coat on an asbestos felt backing. Each plastisol is cast in a film which, when fused at 205° C. for 130 seconds and then cooled below its freezing point, provides a wear layer of uniform thickness between 0.31 and 0.38 mm on the floor covering. The wear layers produced with plastisols 1–6, F and G are essentially equivalent in resistance to wrinkling. In comparative stain resistance evaluations, DuPont Oil Yellow Dye (0.5% in odorless kerosene) is dripped onto a 2.5 cm.-square piece of #2 filter paper lying horizontally on a sample of each wear layer at room temperature until saturation of the paper. Thirty minutes later, the filter papers are removed and the wear layer samples are blotted and wiped with mineral spirits. In parallel testing, a semi-solid road surfacing material of moderate staining tendency is spread with a spatula on another sample of each wear layer and, after thirty minutes, wiped off with mineral spirits. The stains remaining on the wear layer samples are then visually evaluated according to a scale on which one represents no visible stain and 12 represents severe staining. Duplicate samples are wrapped in aluminum foil and then oven-aged at 40° C. for 16 hours before staining. Results are in Table III.

TABLE III

| | PLASTISOLS | | | | | | | |
|---|---|---|---|---|---|---|---|---|
| | Not Oven-aged | | | | | | | |
| Stainant | 1 | 2 | 3 | 4 | 5 | 6 | F | G |
| Yellow Dye Road | 1 | 1 | 1.5 | 1 | 1.5 | 2 | 4 | 2 |
| Surfacing Material | 1.5 | 1.5 | 1.5 | 1.5 | 1.5 | 1.5 | 5.5 | 4 |
| | Oven-aged | | | | | | | |
| Yellow Dye Road | 3.5 | 5.5 | 6 | 4.5 | 6 | 6.5 | 6.5 | 4 |
| Surfacing Material | 1.5 | 1.5 | 1.5 | 1.5 | 1.5 | 3 | 5.5 | 4.5 |

EXAMPLES 7–14

In larger-scale tests, Plasticizers A–D, F and G are evaluated in various plasticizing amounts in plastisol-applied PVC flooring wear layers as described hereinbefore. Compositions of the plastisols and their Brookfield viscosities measured in accordance with SPI procedure VD-T1 (1959) after storage for seven days at 23° C. are in Table IV.

TABLE IV

| | PLASTISOLS | | | | | | | | | |
|---|---|---|---|---|---|---|---|---|---|---|
| | F₂ | G₂ | 7 | 8 | 9 | 10 | 11 | 12 | 13 | 14 |
| Plasticizer | F | G | A | A | A | B | B | B | C | D |
| phr Plasticzer | 48 | 48 | 36 | 40 | 44 | 36 | 40 | 44 | 40 | 40 |
| phr Prime Ester | 37.4 | 47.5 | 25.2 | 28 | 30.8 | 25.2 | 28 | 30.8 | 28 | 28 |
| Viscosity Data rpm | | | | | Centipoises | | | | | |
| 2.5 | 5440 | 6400 | 15,680 | 8000 | 4800 | 19,840 | 8960 | 5120 | 9280 | 6400 |
| 5 | 5120 | 5920 | 12,160 | 5760 | 3360 | 15,040 | 6720 | 3680 | 6880 | 4800 |
| 10 | 4720 | 5680 | 9,840 | 4560 | 2720 | 11,840 | 5200 | 2880 | 5520 | 3840 |
| 20 | 4720 | 5640 | 7,960 | 3640 | 2160 | 9,480 | 4360 | 2360 | 4360 | 3080 |
| 50 | 4992 | 6080 | 6,544 | 3024 | 1808 | 7,648 | 3552 | 1968 | 3584 | 2560 |
| 100 | 5712 | 6992 | 6,080 | 2840 | 1672 | 6,944 | 3272 | 1800 | 3272 | 2416 |

The above plastisols $F_2$, $G_2$ and 7–14 are all medium in visual speed of air release. Solid films and floor covering wear layers are prepared and evaluated as in Examples 1–6, F and G except that films of uniform thickness between 0.76 and 0.89 mm are cast on release paper rather than an aluminum plate for the ASTM tests, oven aging is at 49° C. for seven days and the stain resistance comparisons are carried out with cordovan shoe polish, mustard and road surfacing materials of moderate, heavy and very heavy staining tendencies. ASTM test results are in Table V. Stain resistance comparison results are in Table VI.

TABLE V

| Plastisol | 100% Modulus (kg/cm²) | % Elongation at Break | Tensile Strength (kg/cm²) |
|---|---|---|---|
| F₂ | 165 | 261 | 243 |
| G₂ | 142 | 233 | 217 |
| 7 | 139 | 217 | 210 |
| 8 | 118 | 264 | 220 |
| 9 | 100 | 286 | 210 |
| 10 | 139 | 263 | 236 |
| 11 | 118 | 283 | 229 |
| 12 | 99 | 293 | 208 |
| 13 | 113 | 289 | 229 |
| 14 | 120 | 261 | 215 |

TABLE VI

| | PLASTISOLS | | | | | | | | | |
|---|---|---|---|---|---|---|---|---|---|---|
| | Not Oven-Aged | | | | | | | | | |
| | $F_2$ | $G_2$ | 7 | 8 | 9 | 10 | 11 | 12 | 13 | 14 |
| Cordovan Shoe Polish | 10 | 7.5 | 5.5 | 5 | 6.5 | 5.5 | 6 | 7 | 6.5 | 5.5 |
| Mustard | 1.5 | 2 | 1.5 | 1.5 | 1.5 | 1.5 | 1.5 | 1.5 | 1.5 | 1.5 |
| Road Surfacing Materials | | | | | | | | | | |
| Moderate Stainant | 6 | 4 | 1.5 | 1.5 | 1.5 | 1.5 | 1.5 | 1.5 | 1.5 | 1.5 |
| Heavy Stainant | 10 | 9 | 2 | 2 | 2.5 | 2.5 | 2.5 | 3.5 | 2.5 | 3 |
| Very Heavy Stainant | 12 | 11 | 5.5 | 5.5 | 6.5 | 7 | 7.5 | 8 | 7 | 6.5 |
| | Oven-Aged | | | | | | | | | |
| Moderate Stainant | 6 | 5 | 2.5 | 2.5 | 3 | 3 | 3 | 3.5 | 2.5 | 3 |
| Heavy Stainant | 8.5 | 7.5 | 3.5 | 4 | 5 | 4 | 5 | 6 | 5.5 | 4 |
| Cordovan Shoe Polish | 11 | 10 | 8 | 8 | 8.5 | 8.5 | 8.5 | 8.5 | 8.5 | 8 |

EXAMPLES 15-16

By procedures like those in the previous examples, Plasticizer E is compared with Plasticizer B. Visual air release speeds of the plastisols, each of which contained 40 phr plasticizer (28 phr prime ester) are medium. ASTM test results are in Table VII. Stain resistance comparison results are in Table VIII.

TABLE VII

| Plastisol | 100% Modulus ($kg/cm^2$) | % Elongation at Break | Tensile Strength ($kg/cm^2$) |
|---|---|---|---|
| 15 (Plasticizer B) | 123 | 235 | 216 |
| 16 (Plasticizer E) | 118 | 244 | 221 |

TABLE VIII

| | PLASTISOLS | |
|---|---|---|
| Road Surfacing Material | 15 | 16 |
| Moderate Stainant | 0.5 | 0.5 |
| Heavy Stainant | 1.5 | 1.5 |
| Very Heavy Stainant | 6.5 | 5.5 |

It will be apparent from the foregoing data that, compared with VCP compositions plasticized with prime ester other than the aforementioned alkyl benzyl succinates and/or glutarates, compositions of this invention containing substantially lower amounts of prime ester provide plastisols which are advantageously more pseudoplastic and plastisol-applied films of desirably lower 100% modulus and higher % elongation at break.

I claim:

1. A vinyl chloride polymer composition comprising a plasticizing amount of prime ester at least about 40% by weight of which is diester selected from alkyl benzyl succinates, glutarates and mixtures thereof in which said alkyl is from about $C_3$ to about $C_6$, said amount being less than 35 phr.

2. Composition of claim 1 wherein said alkyl is from $C_3$ to $C_5$.

3. Composition of claim 1 wherein said diester is predominantly succinate.

4. Composition of claim 1 wherein said diester is at least about 60% by weight of said prime ester and said amount is not more than about 30 phr.

5. Composition of claim 4 wherein said alkyl is predominantly butyl.

6. Composition of claim 1, said prime ester consisting essentially of said diester.

7. Composition of claim 6 wherein said amount is at least about 25 phr.

8. Composition of claim 7 wherein said alkyl is from $C_3$ to $C_5$ and said polymer is essentially polyvinyl chloride.

9. Composition of claim 1 wherein said polymer is finely divided and essentially uniformly dispersed in said prime ester.

10. Composition of claim 9 wherein said diester is at least about 60% by weight of said prime ester and said amount is not more than about 30 phr.

11. Composition of claim 10 wherein said alkyl is from $C_3$ to $C_5$.

12. A method for producing a vinyl chloride polymer composition which can be cast in a film on a solid surface, fused and then cooled to provide a solid, plasticized, stain-resistant film on said surface, which method comprises dispersing finely divided particles of said polymer in a plasticizing amount of prime ester at least about 40% by weight of which is diester selected from alkyl benzyl succinates, glutarates and mixtures thereof in which said alkyl is from about $C_3$ to about $C_6$, said amount being less than 35 phr.

13. Method of claim 12 wherein said diester is at least about 60% by weight of said prime ester and said amount is not more than about 30 phr.

14. Method of claim 12 wherein said alkyl is from $C_3$ to $C_5$ and said amount is at least about 25 phr, said prime ester consisting essentially of said diester.

* * * * *

UNITED STATES PATENT AND TRADEMARK OFFICE
CERTIFICATE OF CORRECTION

PATENT NO. : 4,243,571

DATED : January 6, 1981

INVENTOR(S) : James D. Gabbard

It is certified that error appears in the above-identified patent and that said Letters Patent are hereby corrected as shown below:

In the title, "ALKYLBENZYL" should be -- ALKYL BENZYL --.

Column 5, line 4, "mW" should read -- MW --.

Column 5, line 62, "2,961,322" should be -- 2,961,332 --.

Column 6, line 52, Table I, column G, "$\frac{40.8}{47.5}$" should read -- 40.8-47.5 --.

Signed and Sealed this

Twenty-eighth Day of April 1981

[SEAL]

Attest:

RENE D. TEGTMEYER

Attesting Officer

Acting Commissioner of Patents and Trademarks